US009158391B2

(12) United States Patent
Lee et al.

(10) Patent No.: US 9,158,391 B2
(45) Date of Patent: Oct. 13, 2015

(54) METHOD AND APPARATUS FOR CONTROLLING CONTENT ON REMOTE SCREEN

(71) Applicant: Electronics and Telecommunications Research Institute, Daejeon-si (KR)

(72) Inventors: Moon-Soo Lee, Daejeon-si (KR); Min-Jung Kim, Daejeon-si (KR); Sun-Joong Kim, Daejeon-si (KR); Kee-Seong Cho, Daejeon-si (KR); Won-Joo Park, Daejeon-si (KR); Won Ryu, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 172 days.

(21) Appl. No.: 13/666,939

(22) Filed: Nov. 1, 2012

(65) Prior Publication Data

US 2013/0113738 A1    May 9, 2013

(30) Foreign Application Priority Data

Nov. 8, 2011  (KR) .......................... 10-2011-0115912

(51) Int. Cl.
  *G06F 3/0346*  (2013.01)
  *G06F 3/0488*  (2013.01)
  *H04M 1/725*  (2006.01)
  *G06F 3/14*  (2006.01)

(52) U.S. Cl.
  CPC ............ *G06F 3/0346* (2013.01); *G06F 3/0488* (2013.01); *G06F 3/1454* (2013.01); *H04M 1/72533* (2013.01)

(58) Field of Classification Search
  CPC .................. G06F 3/044–3/045; G06F 3/0488; G06F 3/04883
  USPC ......................................................... 345/173
  See application file for complete search history.

(56) References Cited

U.S. PATENT DOCUMENTS

| 6,774,889 | B1 |   | 8/2004 | Zhang et al. |
| 7,952,063 | B2 | * | 5/2011 | Peters ........................... 250/221 |
| 8,537,231 | B2 | * | 9/2013 | Mekenkamp et al. ...... 348/222.1 |
| 2007/0080845 | A1 |   | 4/2007 | Amand |
| 2010/0231511 | A1 |   | 9/2010 | Henty et al. |
| 2010/0259491 | A1 |   | 10/2010 | Rajamani et al. |
| 2010/0304787 | A1 | * | 12/2010 | Lee et al. .................... 455/556.1 |
| 2010/0317332 | A1 | * | 12/2010 | Bathiche et al. ............... 455/418 |
| 2011/0145863 | A1 | * | 6/2011 | Alsina et al. ..................... 725/44 |
| 2012/0192078 | A1 | * | 7/2012 | Bai et al. ........................ 715/740 |

FOREIGN PATENT DOCUMENTS

| KR | 10-2006-0125735 A | 12/2006 |
| KR | 10-2010-0129629 A | 12/2010 |
| KR | 10-2011-0077315 A | 7/2011 |

\* cited by examiner

*Primary Examiner* — Kent Chang
*Assistant Examiner* — Nathan Brittingham

(57) ABSTRACT

There is provided a mobile terminal with a camera, such as a smart phone, capable of controlling the functions of a remote screen and content displayed on the remote screen. The mobile terminal defines a remote screen area in an image obtained by capturing the remote screen, receives remote screen resource information, and performs screen mapping between the remote screen area and the remote screen using the remote screen resource information. If it receives a user input signal related to the remote screen area, the mobile terminal generates event information for controlling an object based on the results of the screen mapping, and transmits the event information to a remote apparatus with the remote screen. The remote apparatus processes the event information and controls the object.

9 Claims, 9 Drawing Sheets

FIG. 8

```
                        801            802
                         ↓              ↓
800 ~<Device name="user1" type="multi_touch">
    810 ~<Action name="event1" type="touchstart">
    820 ~<PointList>              ↑           ↑
        830 ~<Point id="0">      811         812
            <x>10</x>
            <y>20</y>
        </Point>
        <Point id="1">
            <x>30</x>
            <y>40</y>
        </Point>

....

</PointList>
<Device>
```

FIG. 9

| Multi-touch Events | Mouse Events |
|---|---|
| touchstart | mousedown |
| touchmove | mousemove |
| touchend | mouseup |
| touchcancel | mouseleave |

METHOD AND APPARATUS FOR CONTROLLING CONTENT ON REMOTE SCREEN

CROSS-REFERENCE TO RELATED APPLICATION

This application claims the benefit under 35 U.S.C. §119 (a) of Korean Patent Application No. 10-2011-0115912, filed on Nov. 8, 2011, the entire disclosure of which is incorporated herein by reference for all purposes.

BACKGROUND

1. Field

The following description relates to an apparatus for remotely controlling content on the screen of a device, such as a TV, a PC, a notebook, etc., using a smart phone.

2. Description of the Related Art

In general, there are different kinds of devices such as a PC, a mobile phone, a TV, etc. They provide different services, such as web data search, call services, multimedia services, etc., depending on their intrinsic functions and content. However, due to the development of a smart phone and a smart TV, various kinds of content that were provided only by desktop computers are able to be consumed through smart mobile devices. In particular, a smart phone allows a user to receive his or her desired service or to do his or her works anytime, anywhere since the user can always carry the smart phone. Also, smart devices provide users with various kinds of services, such as music, video, news, etc., and connect to other smart devices through a network to offer interactive services.

Recently, as desktop computers, smart TVs, and smart phones can handle various kinds of content, content sharing is required gradually and also especially has drawn attention to home network and Digital Living Network Alliance (DLNA) technology. However, the technologies are focused on sharing of multimedia content such as music, images, video, or the like. The reason is that multimedia content is preferred content that can be controlled through a simple user interface. However, as a web browser is installed in many smart devices, multimedia, additional information (description, advertisement, games, a messenger, etc.), as well as applications allow users to be used. Therefore, a diversity of web content that can be displayed on the screen of a smart device is increasing. Accordingly, in order to select desired content among various kinds of web content, and share and move the selected content, there is substantial demand for improvement of a user interface.

The main differences of the iPhone and android phones from conventional smart phones are that the iPhone and android phones have an App store and a user interface allowing users to easily and conveniently use content in their mobile phones. In particular, a multi-touch interface allows users to easily zoom in/out or move content of a mobile phone. Recently, researches in technology for easily using three-Dimensional (3D) content-1 based on recognition of multi-touch gestures are also being conducted.

Generally, the multi-touch interface has been applied to a smart phone, a smart pad, and a notebook. Applying the multi-touch interface to an electronic device with a large screen, such as a smart TV, a projector, an electronic display board, etc., is not economical due to high manufacturing costs. In many cases, since such an electronic device with a large screen is remotely controlled, a simple button-type interface such as a remote controller has been used to control the functions of the electronic device. However, as a smart TV allows a web browser to display more various kinds of content on its screen and control more various applications, an integrated remote controller for dealing with such content and applications is needed. Furthermore, in the conventional remote controller, a functional extension of the remote controller was inevitably accompanied by addition of buttons or combinations of button inputs. That is, it will be difficult for a user to handle the controller when functions are added and the structure of the controller is complex. In order to overcome this problem, various technologies, such as an apparatus for recognizing a user's gestures using a camera, an apparatus for location detection using a laser pointer, a method of adding a mouse pad to a remote controller, etc., have been developed. However, these technologies are also quite costly.

An example of such conventional technology is disclosed in Korean Laid-open Patent Application No. 10-2006-0125735, entitled "Universal Remote Control Device with Touch Screen", and laid-open on Dec. 6, 2006.

SUMMARY

The following description relates to a method of controlling a remote screen and content on the remote screen, using a smart phone that is always carried by a user and includes various input and output devices, such as buttons, a multi-touch screen, a voice recognition device, a camera, etc.

In one general aspect, there is provided a mobile terminal including: a photographing unit configured to capture a remote screen displaying content including one or more objects that are able to be controlled; a display unit configured to display an image of the captured remote screen; a user input unit configured to receive user input events for controlling at least one of the objects; a communication unit configured to receive remote screen resource information for controlling the objects on the remote screen, from a remote apparatus with the remote screen; and a controller configured to define a remote screen area in the image of the captured remote screen, to perform screen mapping between the rectangle bounds of remote screen area and the real remote screen, to generate, if user input events related to the rectangle of the remote screen are occurred, event information for controlling an object corresponding to the user input signal based on the results of the screen mapping, and to transmit the event information to the remote apparatus through the communication unit.

In another general aspect, there is provided a method in which a mobile terminal controls a remote screen, including: connecting to the remote screen through a network; receiving remote screen resource information from a remote apparatus with the remote screen, wherein the remote screen resource information is used to remotely control content including one or more controllable objects that are provided on the remote screen; defining a remote screen area in a remote screen image obtained by capturing the remote screen; performing screen mapping between the remote screen area and the remote screen, based on the remote screen resource information; receiving a user input signal related to the remote screen area; generating event information for controlling an object corresponding to the user input signal based on the results of the screen mapping; and transmitting the event information to the remote apparatus with the remote screen.

In another general aspect, there is provided a remote apparatus including: a display unit configured to provide content including one or more objects that are able to be controlled; a communication connection manager configured to receive input event information for controlling at least one of the objects, from a mobile terminal; a resource manager configured to control, if a communication connection request is received from the mobile terminal, the communication connection manager to provide the mobile terminal with remote screen resource information that is used to control the objects; an input event converter configured to convert the input event information of a mobile terminal into remote screen event information that is able to be used in a remote screen; a screen object information manager configured to manage representation information of the objects, and to select an object indicated by the remote screen event information, based on the representation information of the objects; and an input event processor configured to generate a control event for controlling the selected object.

In another general aspect, there is provided an operation method of a remote apparatus that is controlled by a mobile terminal, including: displaying content including one or more objects that are able to be controlled; receiving input event information for controlling the objects, from the mobile terminal; converting the input event information into remote screen event information that is used in a remote screen; selecting an object indicated by the remote screen event information based on representation information of the objects; and controlling the selected object using the remote screen event information.

Other features and aspects will be apparent from the following detailed description, the drawings, and the claims.

BRIEF DESCRIPTION OF THE DRAWINGS

FIG. 8 shows user touch event information received from the mobile terminal of FIG. 5.

FIG. 9 shows a configuration example of a conversion adaptor.

Figure 1:
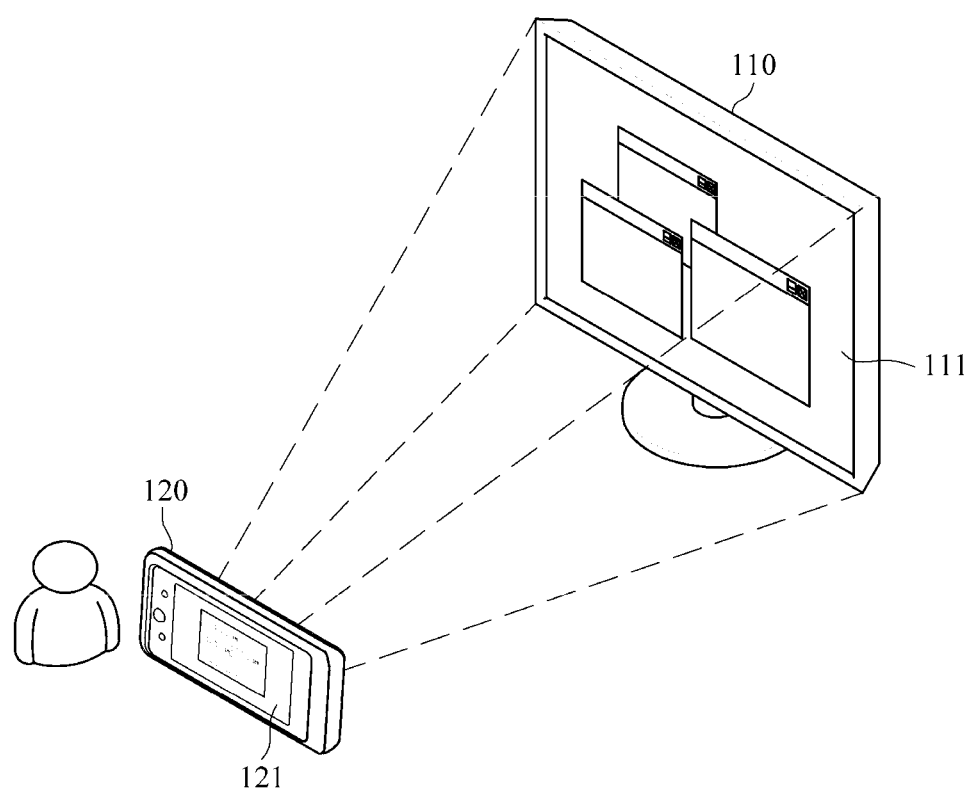
FIG. 1 shows an example of a system configuration environment for controlling a remote apparatus using a mobile terminal.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 shows an example of a system configuration environment for controlling a remote apparatus 110 using a mobile terminal 120.

Referring to FIG. 1, the remote apparatus 110 includes a remote screen 111 for displaying content. The remote apparatus 110 has a user input and output interface that receives signals for controlling the remote apparatus 110 from a user input unit, such as a keyboard, a mouse, a touch screen, a trackball, etc. Also, the remote apparatus 110 may include a wired or wireless network device for connecting to external devices.

The mobile terminal 120 controls content of the remote apparatus 110. The remote apparatus 110 may include all apparatuses, such as a desktop PC, a smart TV, a projector, a digital signage, a public display, any device with large screen, etc., which can provide visual information to users. The mobile terminal 120 may be an arbitrary terminal, such as a mobile phone, a smart phone, any device with a camera and a network adapter, etc., having a convenient input and output interface such as a touch screen. Also, the mobile terminal 120 may be configured to capture the remote screen 111 using a camera, and to enable a user to view content displayed on the remote screen 111 through a display screen 121 of the mobile terminal 120. The content of the remote screen 111, which is displayed on the display screen 121, may be provided using a camera application.

According to an example, the mobile terminal 120 may operate in a remote control mode in which the content of the remote screen 111 is controlled using an image obtained by capturing the remote apparatus 110. In the remote control mode, the user may perform a remote control function of selecting, moving, zooming in/out, and executing the content of the remote screen 111 through the display screen 121 of the mobile terminal 120, using the user interface of the mobile terminal 120, instead of the user interface of the remote screen 111. The content includes one or more objects that can be controlled, and each object may be an arbitrary object, such as a mouse cursor, a user input button, link information, etc., which can be controlled according to an event generated by a user input signal.

Figure 2:
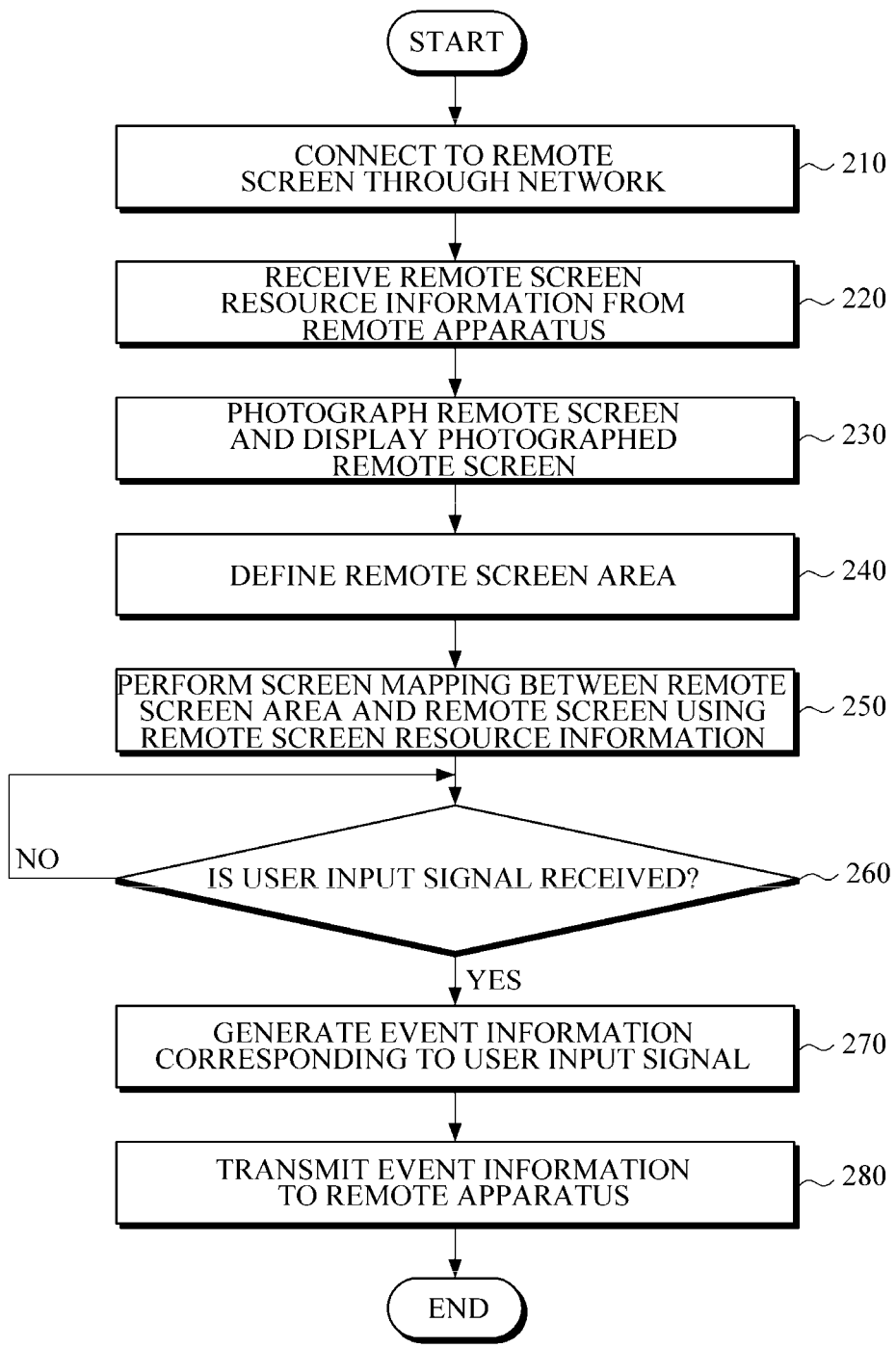
FIG. 2 is a flowchart illustrating an example of a process of transmitting a user control signal to a remote apparatus through a camera screen of the mobile terminal of FIG. 1.

FIG. 2 is a flowchart illustrating an example of a process of transmitting a user control signal to the remote apparatus 110 through a camera screen of the mobile terminal 120 of FIG. 1.

Referring to FIGS. 1 and 2, the mobile terminal 120 connects to the remote apparatus 110 with the remote screen 111 through a wired/wireless network.

The mobile terminal 120 receives remote screen resource information, such as a screen size, a connection session ID, a location, model information, etc., required for remote control, from the remote apparatus 110. The remote screen resource information may include information about the thickness, color, specific identifier, etc., of the border of the remote screen 111 so that the size of the remote screen 111 can be easily extracted by an image extraction algorithm.

The mobile terminal 120 photographs the remote screen 111, and displays the captured remote screen 111 on the display screen 121 of the mobile terminal 120 (230). The remote screen 111 provides content including one or more objects that can be controlled, and the mobile terminal 120 may display the remote screen 111 as a camera screen. The operation 230 may be performed before the operations 210 and 220 or simultaneously with the operations 210 and 220.

The display screen 121 of the mobile terminal 120 may further include a background screen. The mobile terminal 120 defines a remote screen area corresponding to the remote screen 111, which will be displayed on the display screen 121 (240). The remote screen area may be defined by a user through an area setting function that is provided by the mobile terminal 120. Or, the remote screen area may be defined using a method of extracting a remote screen area by applying an image processing technique such as an edge extraction algorithm to a captured image of the remote screen 111, displayed on the display screen 121 of the mobile terminal 120. Or, the mobile terminal 120 may apply the edge extraction algorithm to a captured image of the remote screen 111 to define a remote screen area and display the remote screen area on the display screen 121, and a user may send a user input to finally decide the remote screen area.

Thereafter, the mobile terminal 120 performs screen mapping between the remote screen area decided in operation 240 and the remote screen 111, using the screen size of the remote screen 111, included in the remote screen resource information (250). The screen mapping means extracting the correspondence relationship between the coordinate values of the remote screen area and the coordinate values of the remote screen 111. The mobile terminal 120 may acquire a conversion matrix related to the rotation angle and scale difference between the remote screen area and remote screen 111 through the screen mapping. Also, the mobile terminal 120 may initialize its user input device, for example, a user input interface, such as a touch screen, a mouse, etc.

The mobile terminal 120 determines whether a user input signal (or, a user input event) is generated through the user input interface, using the camera application (260). If no user input event is generated, the mobile terminal 120 is maintained in a standby state.

If a user input event is generated, the mobile terminal 120 checks the generation position of the user input event and the type of the user input event, and generates event information based on the results of the checking (270). In detail, the mobile terminal 120 converts the generation position of the user input event into the corresponding position on the remote screen 111 using the conversion matrix acquired in operation 250. That is, the mobile terminal 120 may apply the generation position of the user input event to the conversion matrix to thereby calculate the corresponding coordinate values on the remote screen 111. The event information may include information for creating an event for controlling content or an object on the remote screen 111. The event information includes the type of the event, an event action corresponding to the event type, and event coordinates that are the corresponding coordinate values on the remote screen 111.

The mobile terminal 120 transmits the event information to the remote apparatus 110 (280).

Meanwhile, the operation 240 of defining the remote screen area and the operation 250 of performing screen mapping between the remote screen area and the remote screen 111 may be performed whenever it is determined that the mobile terminal 120 shakes or moves.

If a change in motion of the mobile terminal 120 is detected, the mobile terminal 120 may define a new remote screen area, and generate a conversion matrix for converting the coordinates of the newly defined remote screen area into the corresponding coordinates on the remote screen 111, thereby updating the conversion matrix according to the detected change in motion of the mobile terminal 120. After the conversion matrix is updated, a user input signal that is next received may be processed using the updated conversion matrix.

Figure 3:
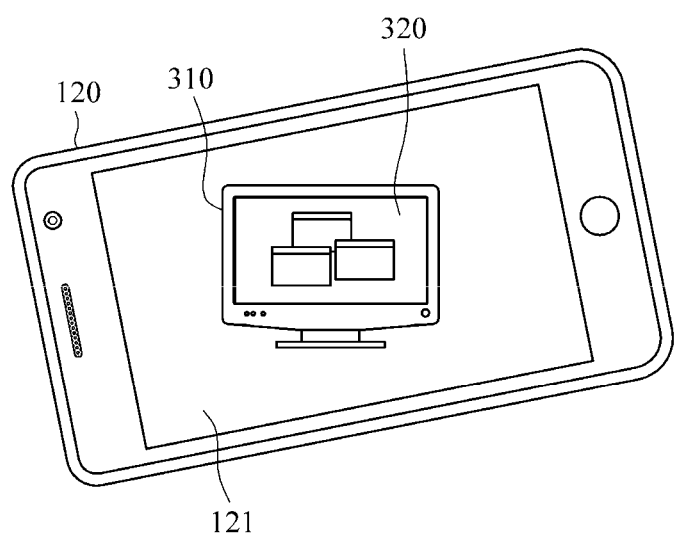
FIG. 3 is a view for explaining operation of defining a remote screen area in a display screen of the mobile terminal, in the process of FIG. 2.

FIG. 3 is a view for explaining the operation 240 of defining the remote screen area in the display screen 121 of the mobile terminal 120.

If the user executes the remote control mode of the mobile terminal 120, the mobile terminal 120 may photograph a remote screen 310 of a remote apparatus, and display the captured image of the remote screen 310 on the display screen 121. Since the display screen 121 includes a background area as well as the remote screen 310, the mobile terminal 120 defines a remote screen area 320 in the image displayed on the display screen 121. As described above, the remote screen area 320 may be defined automatically using the edge extraction algorithm, or by the user through an input interface, such as a mouse and a touch screen.

Figure 4:
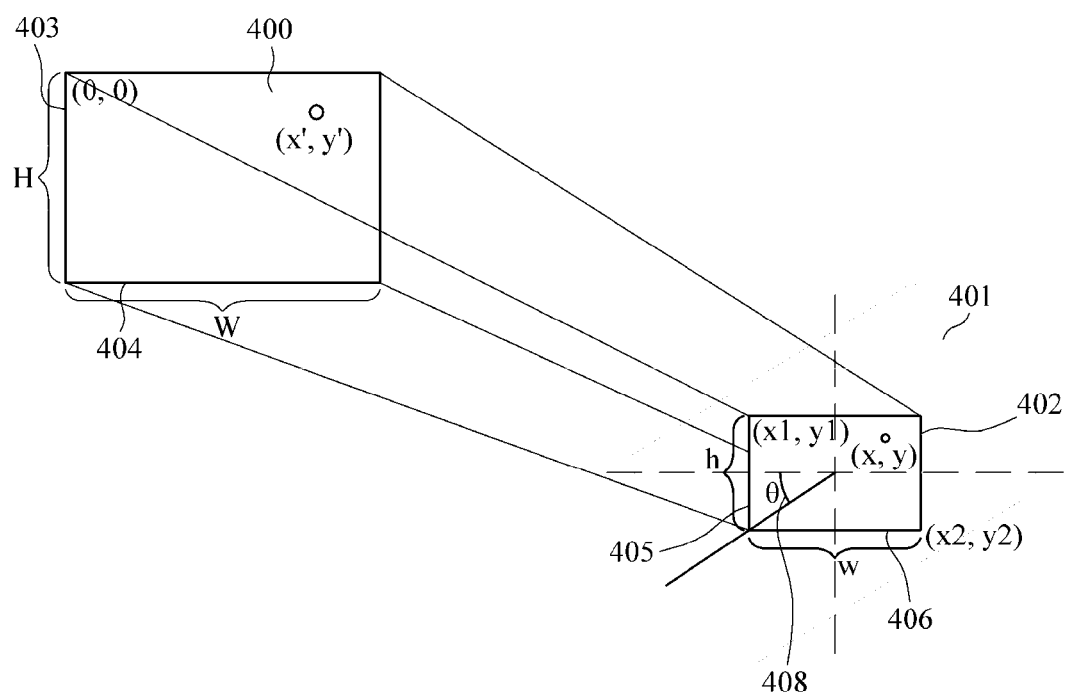
FIG. 4 is a view for explaining a screen mapping operation in detail.

FIG. 4 is a view for explaining a screen mapping operation corresponding to the operation 250 of FIG. 2 in detail.

In FIG. 4, a reference numeral 400 represents the remote screen of a remote apparatus, a reference numeral 401 represents the display screen of the mobile device 120 (see FIG. 1), and a reference numeral 402 represents a remote screen area that corresponds to the remote screen 400 projected onto the display screen 401 of the mobile device 120.

In order to perform screen mapping, the sizes and coordinate information of the remote screen 400, the display screen 401 of the mobile terminal 120, and the remote screen area 402 projected onto the display screen 401 of the mobile terminal 120 are needed.

In the example of FIG. 4, it is assumed that the height 403 and width 404 of the remote screen 400 are H and W, respectively, and the height 405 and width 406 of the display screen 401 of the mobile terminal 120 are h and w, respectively. Also, it is assumed that the coordinates of two vertices of the remote screen area 402 in a diagonal direction are (x1, y1) and (x2, y2), respectively. Also, the angle of inclination 408 of the remote screen area 402 with respect to the display screen 401 is θ. The angle θ may be, as shown in FIG. 4, defined as the angle of inclination of the remote screen area 402 with respect to the display screen 401 in the width direction.

A conversion matrix is created based on the above-mentioned information, and the coordinates (x, y) of the display screen 401 of the mobile terminal 120 are applied to the conversion matrix to thereby calculate the coordinates (x', y') of the remote screen 400. The operation can be expressed as Equation 1, below.

$$X' = M \cdot X, \quad (1)$$

where M is the conversion matrix, X is a matrix representing the coordinates (x, y) of the display screen 401 of the mobile terminal 120, and X' is a matrix representing the coordinates (x', y') of the remote screen 400.

Equation 1 can be rewritten to Equation 2, below.

$$\begin{pmatrix} x' \\ y' \\ 1 \end{pmatrix} = \begin{pmatrix} W/w & 0 & 0 \\ 0 & H/h & 0 \\ 0 & 0 & 1 \end{pmatrix} \begin{pmatrix} 1 & 0 & (x_2 - x_1)/2 \\ 0 & 1 & (y_2 - y_1)/2 \\ 0 & 0 & 1 \end{pmatrix} \begin{pmatrix} \cos(\theta) & \sin(\theta) & 0 \\ -\sin(\theta) & \cos(\theta) & 0 \\ 0 & 0 & 1 \end{pmatrix} \begin{pmatrix} 1 & 0 & -(x_1 + x_2)/2 \\ 0 & 1 & -(y_1 + y_2)/2 \\ 0 & 0 & 1 \end{pmatrix} \begin{pmatrix} x \\ y \\ 1 \end{pmatrix} \quad (2)$$

Figure 5:
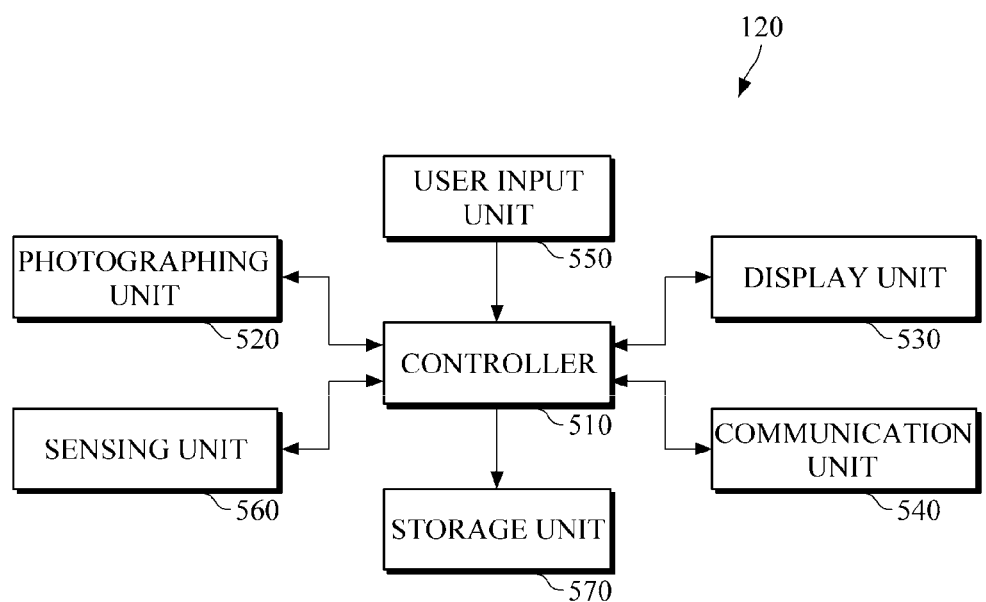
FIG. 5 is a diagram illustrating an example of a mobile terminal.

FIG. 5 is a diagram illustrating an example of the mobile terminal 120.

Referring to FIG. 5, the mobile terminal 120 may include a controller 510, a photographing unit 520, a display unit 530, a communication unit 540, a user input unit 550, a sensing unit 560, and a storage unit 570.

Referring to FIGS. 1 and 5, the controller 510 may be configured to control overall operation of the mobile terminal 120. The controller 510 may control content displayed on a remote screen of the remote apparatus 110, and one or more objects configuring the content.

The photographing unit 520 captures a remote screen that displays content including one or more controllable objects. The photographing unit 520 may be a camera module.

The display unit 530 is a display device for displaying an image of the captured remote screen.

The user input unit 540 receives a user input signal for controlling the objects included in the content. The user input unit 540 may be a touch screen, a touch pad, a key pad, a mouse, a trackball, etc.

The communication unit 540 provides a communication interface for communicating with the remote apparatus with the remote screen. The communication unit 540 may receive remote screen resource information that is to be used to control the objects on the remote screen. The remote screen resource information may include a screen size of the remote screen, and a connection session ID. Also, the communication unit 540 transmits the results of the controller 510 processing the user input event to the remote apparatus 110.

The controller 510 defines a remote screen area in the image captured by the photographing unit 520. The controller 510 may define the remote screen area by applying the edge extraction algorithm to the captured image. Or, the controller 510 may define a remote screen area based on a user input signal. Or, the controller 510 may apply the edge extraction algorithm to a captured image of the remote screen to define a remote screen area and display the remote screen area through the display unit 530, and a user may send a user input to finally decide the remote screen area.

The controller 510 may perform screen mapping between the remote screen area and the remote screen using the remote screen resource information. The controller 510 may create a conversion matrix for converting the coordinates of the remote screen area into the corresponding coordinates of the remote screen in order to perform screen mapping between the remote screen area and the remote screen.

The controller 510 may generate, if it receives a user input signal related to the remote screen area, event information for controlling at least one of the objects, based on the results of the screen mapping. The event information may include an event type, an event action corresponding to the event type, and event coordinates. For this, the controller 510 may decide the type of an event corresponding to the user input signal, and apply coordinate values corresponding to the user input signal to the conversion matrix to thereby calculate event coordinates that are the corresponding coordinate values of the remote screen.

The controller 510 may transmit the event information to the remote apparatus 110 through the communication unit 540.

The sensing unit 560 detects a change in motion of the mobile terminal 120, including a change in location or position of the mobile terminal 120. In order to detect a change in motion of the mobile terminal 120, the sensing unit 560 may be configured to include a gravity sensor, a gyro sensor, a geo-magnetic sensor, etc. If a change in motion of the mobile terminal 120 is detected by the sensing unit 560, the controller 510 may define a new remote screen area in the remote screen image displayed on the display unit 530, and generate a conversion matrix for converting the coordinates of the newly defined remote screen area into the corresponding coordinates of the remote screen, thereby updating the conversion matrix according to the detected change in motion of the mobile terminal 120.

The storage unit 570 may store an OS of the mobile terminal 120, and application programs and data for remote control.

Figure 6:
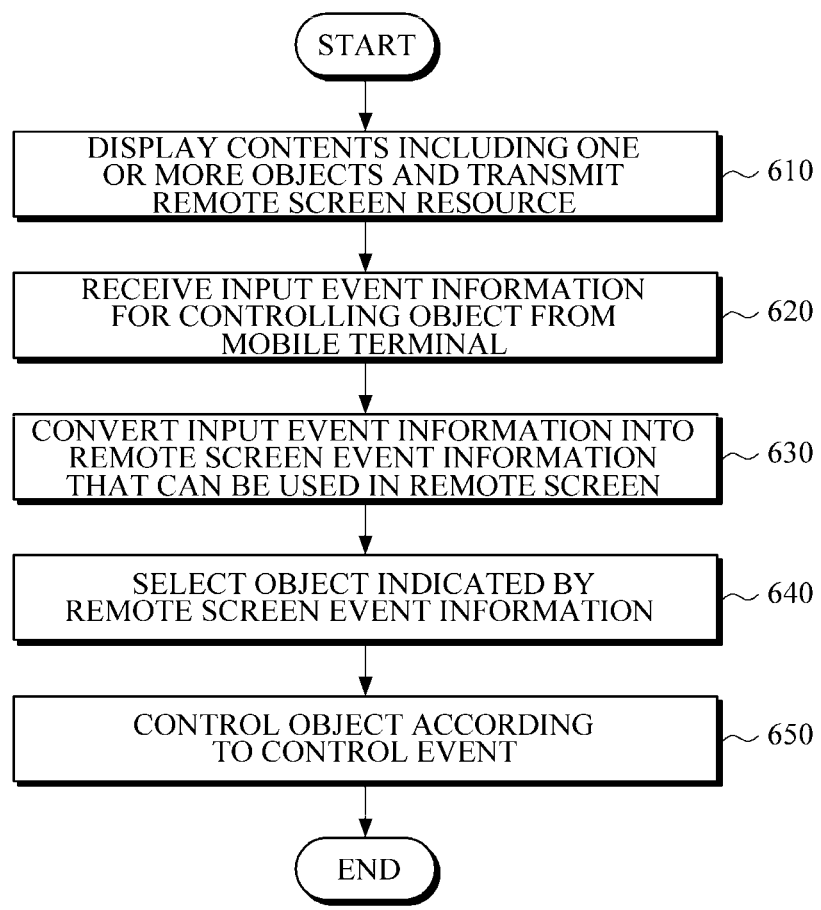
FIG. 6 is a flowchart illustrating an example of an operation method of a remote apparatus with a remote screen.

FIG. 6 is a flowchart illustrating an example of an operation method of the remote apparatus 110 with the remote screen.

Referring to FIGS. 1 and 6, the remote apparatus displays content including one or more objects that can be controlled (610). Also, the remote apparatus 110 may transmit, if it receives a communication connection request from the mobile terminal 120, remote screen resource information including a screen size of the remote screen and a connection session ID to the mobile terminal 120 (610).

Then, the mobile terminal 120 creates input event information for controlling at least one of the objects, based on the remote screen resource information, and transmits the input event information to the remote apparatus 110. That is, the remote apparatus 110 receives the input event information for controlling at least one of the objects from the mobile terminal 120 (620).

Then, the remote apparatus 110 converts the input event information into remote screen event information that can be used in the remote screen (630). The remote apparatus 110 may search for a conversion adaptor for converting the received input event information into the corresponding remote screen event information in database storing a plurality of conversion adaptors for converting input event information into the corresponding remote screen event information, install the found conversion adaptor, and convert the input event information into the corresponding remote screen event information that can be used in the remote screen, using the installed conversion adaptor.

Next, the remote apparatus 110 selects an object indicated by the remote screen event information based on representation information about the objects (640).

Then, the remote apparatus 110 generates a control event for controlling the selected object, and controls the selected object according to the control event (650). Here, the control event is configured to control an object on the remote screen according to remote screen event information and a selection of the object, based on the event information received from the mobile terminal 120.

Also, the remote apparatus 110 may decide, if it receives a plurality of pieces of input event information from a plurality of mobile terminals, a processing order of the plurality of pieces of input event information, convert the plurality of pieces of input event information into the corresponding remote screen event information in the processing order, and control an object(s) based on the remote screen event information.

Figure 7:
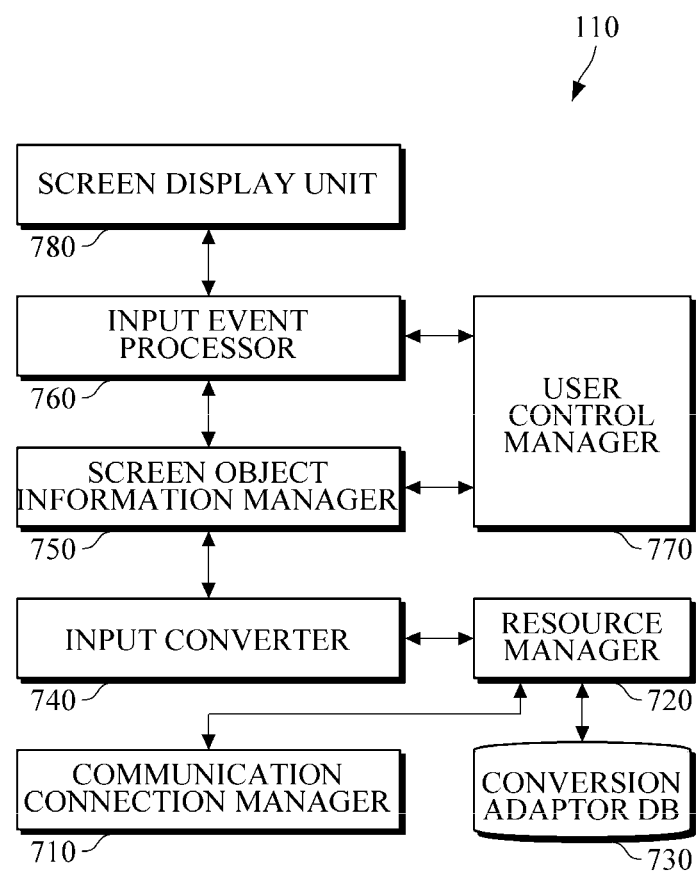
FIG. 7 is a diagram illustrating an example of a remote apparatus with a remote screen.

FIG. 7 is a diagram illustrating an example of the remote apparatus 110 with the remote screen.

Referring to FIG. 7, the remote apparatus 110 includes a communication connection manager 710, a resource manager 720, conversion adaptor database 730, an input converter 740, a screen object information manager 750, an input event processor 760, a user control manager 770, and a screen display unit 780.

The communication connection manager 710, the resource manager 720, the conversion adaptor database 730, the input converter 740, the screen object information manager 750, the input event processor 760, and the user control manager 770 are configured to process input event information received from the mobile terminal 120 (see FIG. 1), and to convert the input event information into remote screen event information that can be used by the screen display unit 780 so that the event according to the input event information is reflected as content or an object(s) displayed on the screen display unit 780.

The screen display unit 780 provides content including one or more objects that can be controlled. The content may be processed by the input event processor 760 and then provided to the screen display unit 780.

The communication connection manager 710 maintains a communication connection to the mobile terminal 120 in order to receive a user event from the mobile terminal 120 through a wired/wireless network. The communication connection manager 710 may receive input event information for controlling the objects from the mobile terminal 120.

The resource manager 720 may manage resources of the remote apparatus 110, the resources including a remote screen size of the screen display unit 780. The resource manager 720 may control, if it receives a communication connection request from the mobile terminal 120, the communication connection manager 710 to provide the mobile terminal 120 with remote screen resource information that is used to control the objects.

Also, the resource manager 720 manages conversion adaptors that can be used in the remote screen. The resource manager 720 may search for, if it receives input event information from the mobile terminal 120, an event corresponding to the received input event information from among events that can be used in the remote screen 111, and transfer, if the event corresponding to the received input event information is found from among the events that can be used in the remote screen 111, the input event information to the input converter 740. If the input event information received from the mobile terminal 120 cannot be processed by the remote apparatus 110, the resource manager 720 may use a conversion adaptor for converting the input event information into the corresponding remote screen event information that can be processed by the remote apparatus 110.

The conversion adaptor database 730 stores at least one conversion adaptor that is used to convert input event information into the corresponding remote screen event information. The conversion adaptor represents information that is used to convert an input event into a remote screen event. The conversion adaptor may be information for converting an event action corresponding to the kind of an input event into an event action corresponding to the kind of the corresponding remote screen event.

The input converter 740 uses an installed conversion adaptor to convert the input event information into the corresponding remote screen event information that can be used in the remote screen. The resource manager 720 searches for a conversion adaptor for converting the input event information into the corresponding remote screen event information, in the conversion adaptor database 730, and provides the found conversion adaptor to the input converter 740. Then, the input converter 740 may convert the input event information into the corresponding remote screen event information using the conversion adaptor.

The input converter 740 may be configured with a runtime engine and convert the input event information into the corresponding remote screen event information using the conversion adaptor that is dynamically used. For this operation, the input converter 740 may install, execute, or terminate at least one conversion adaptor.

The screen object manager 750 manages representation information of one or more objects, and may select an object indicated by the remote screen event information based on the representation information of the objects. The representation information of each object may include at least one piece of information among the location, size, and height of the object that is displayed on the screen display unit 780. The height information of objects may represent a priority order in which the objects appear on a screen.

Since a screen projected onto the mobile terminal 120 has relatively low resolution, a user may have difficulties in exactly selecting some objects on the screen. That is, a user may fail to select a specific object depending on the representation information of objects. Accordingly, the screen object information manager 750 may correct coordinate information of the remote screen event information output from the input converter 740 such that the user can select an exact object depending on the coordinate information of the remote screen event information.

For this, the screen object information manager 750 may correct coordinate information included in the remote screen event information, based on representation information of the objects included in the content. For example, if event coordinates approximate to representation information of a specific object, the screen object information manager 750 may correct the event coordinates to coordinates corresponding to the representation information of the specific object. The screen object information manager 750 may transfer the selected object and the type and coordinate information of the event to the input event processor 760.

The input event processor 760 may generate a control event for controlling the selected object. Also, the input event processor 760 may generate a control event for controlling an object selected according to the coordinate information corrected by the screen object information manager 750. The input event processor 760 may provide content to the screen display unit 780 and process the content according to the control event. The control event is a predetermined event for selecting content or at least one object included in the content and changing a screen to a desired form according to the selected content or object. The control event may be generated by calling a predetermined control event based on information received from the screen object information manager 750.

If the remote apparatus 110 is used by a plurality of users, the remote apparatus 110 may receive two or more input events from two or more users. The user control manager 770 may maintain and manage user control such that events from the individual users can be sequentially applied to content displayed on the screen display unit 780. For this operation, the user control manager 770 may decide, if it receives a plurality of pieces of input event information from a plurality of mobile terminals, a processing order of the input event information. The input event processor 760 may control objects according to the processing order decided by the user control manager 770.

FIG. 8 shows user touch event information received from the mobile terminal 120 of FIG. 5.

Referring to FIGS. 1 and 8, when a user input event is generated, the mobile terminal 120 transmits event information 800 corresponding to the user input event to the remote apparatus 110. The event information 800 includes the user's identifier (ID) 801, an event type 802, event action data 810, and location information 820 at which the event action occurred.

The event action data 810 may include an event's unique name 811 corresponding to an action, such as touch, click, drag/drop, move, etc., performed by the user, and the type 812 of the action.

The location information 820 may include event coordinates that are coordinates to which the event will be applied on a remote screen. There may be provided a plurality of pieces of location information 820 according to the type of the generated event. For example, in the case of a multi-touch event, since two or more pieces of point location information are generated, the corresponding location information may include all the point location information.

The event information 800 of FIG. 8 shows a configuration example when the event is a multi-touch event, however, the event information 800 may be configured in various forms according to the types of events and actions.

FIG. 9 shows a configuration example of a conversion adaptor.

The conversion adaptor shown in FIG. 9 is used to convert a multi-touch event to a mouse event. In the mobile terminal 120 (see FIG. 1), a multi-touch event, such as "touchstart", "touchmove", "touchend", "touchcancel", etc., may be generated through a multi-touch interface. However, if a desktop computer or the remote apparatus 110 (see FIG. 1) with a large screen has no multi-touch interface, the remote apparatus 110 may convert a multi-touch event received from the mobile terminal 120 to an event that can be processed by the remote apparatus 110 using the conversion adaptor of FIG. 9.

According to the conversion adaptor of FIG. 9, multi-touch events "touchstart", "touchmove", "touchend", and "touchcancel" are converted into mouse events "mousedown" "mousemove", "mouseup" and "mouseleave", respectively.

For example, if a multi-touch event is received from the mobile terminal 120 and the remote apparatus 110 supports no multi-touch event, the resource manager 720 of FIG. 7 may transfer the conversion adaptor as shown in FIG. 9 to the input converter 740. Then, the input converter 740 may convert the multi-touch event to a mouse event that can be processed by the remote apparatus 110, using the conversion adaptor. The screen object information manager 750 corrects the coordinates of the mouse event, and transfers information about an object indicated by the corrected coordinates, the mouse event, the corrected coordinate information, etc. to the input event processor 760. Then, the input event processor 760 finally generates a mouse event based on the received information, and may control an object related to the mouse event.

Therefore, according to the examples described above, a user can easily select and control applications or content displayed on a remote screen, using a camera, while viewing the remote screen. Also, by supporting real-time conversion between input events through interface conversion it is possible to remotely control various kinds of devices using a smart phone that a user can always carry.

The present invention can be implemented as computer-readable code in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves such as used in Internet transmission. In addition, the computer-readable recording medium may be distributed to computer systems over a network, in which computer-readable code may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile terminal comprising:
a photographing unit configured to capture a remote screen of a remote apparatus, the remote screen displaying content including one or more objects that are able to be controlled;
a display unit configured to display an image of the captured remote screen;
a user input unit configured to receive a user input signal for controlling at least one of the objects;
a communication unit configured to receive remote screen resource information for controlling the objects on the remote screen, from the remote apparatus; and
a controller configured to define a remote screen area in the image of the captured remote screen, to generate a conversion matrix for converting coordinates of the remote screen area into corresponding coordinates of the remote screen, to perform screen mapping between the remote screen area and the remote screen based on the remote screen resource information and the conversion matrix, to generate, when a user input signal related to the remote screen area is received, event information for controlling an object displayed on the remote screen, which corresponds to the user input signal, based on the results of the screen mapping, and to transmit the event information to the remote apparatus through the communication unit,
wherein the remote screen area corresponds to the whole remote screen.

2. The mobile terminal of claim 1, wherein the remote screen resource information includes a screen size of the remote screen.

3. The mobile terminal of claim 1, wherein the event information include an event type, an event action corresponding to the event type, and event coordinates, and the controller applies coordinate values corresponding to the user input signal to the conversion matrix to calculate the event coordinates.

4. The mobile terminal of claim 1, further comprising a sensing unit configured to detect a change in motion of the mobile terminal, wherein when the change in motion of the mobile terminal is detected, the controller defines a new remote screen area in the image of the remote screen displayed on the display unit, and generate a conversion matrix for converting coordinates of the newly defined remote screen area into corresponding coordinates of the remote screen, thereby updating the conversion matrix according to the detected change in motion of the mobile terminal.

5. A method in which a mobile terminal controls a remote screen, comprising: connecting to a remote apparatus including the remote screen through a network;
receiving remote screen resource information from the remote apparatus, wherein the remote screen resource information is used to remotely control content including one or more controllable objects that are provided on the remote screen;
defining a remote screen area in an image of the remote screen, the image being obtained by capturing the remote screen, wherein the remote screen area corresponds to the whole remote screen;
generating a conversion matrix for converting coordinates of the remote screen area into corresponding coordinates of the remote screen;

performing screen mapping between the remote screen area and the remote screen, based on the remote screen resource information and the conversion matrix; receiving a user input signal related to the remote screen area; generating event information for controlling an object displayed on the remote screen, which corresponds to the user input signal, based on the results of the screen mapping; and transmitting the event information to the remote apparatus.

6. The method of claim 5, wherein the event information includes an event type, an event action corresponding to the event type, and event coordinates, and the event coordinates are calculated by applying coordinate values corresponding to the user input signal to the conversion matrix.

7. The method of claim 5, further comprising: defining, when a change in motion of the mobile terminal is detected, a new remote screen area in the remote screen image; generating a conversion matrix for converting coordinates of the newly defined remote screen area into corresponding coordinates of the remote screen; and updating the conversion matrix according to the detected change in motion of the mobile terminal.

8. The mobile terminal of claim 1, wherein the conversion matrix is determined based on a size of the remote screen, a size of the remote screen area, coordinates of two vertices of the remote screen area in a diagonal direction, and an angle of inclination of the remote screen area with respect to a screen of the display unit.

9. The method of claim 5, wherein the conversion matrix is determined based on a size of the remote screen, a size of the remote screen area, coordinates of two vertices of the remote screen area in a diagonal direction, and an angle of inclination of the remote screen area with respect to a screen of a display unit of the mobile terminal.

* * * * *